United States Patent
Lorell et al.

(10) Patent No.: US 7,275,285 B1
(45) Date of Patent: Oct. 2, 2007

(54) DEPLOYMENT HINGE

(75) Inventors: Kenneth R. Lorell, Los Altos, CA (US); Patrick J. Champagne, Portola Valley, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 96 days.

(21) Appl. No.: 10/986,881

(22) Filed: Nov. 15, 2004

(51) Int. Cl.
*E05D 11/10* (2006.01)

(52) U.S. Cl. .............................. 16/321; 16/278; 16/286

(58) Field of Classification Search .................. 16/321, 16/330, 303, 286 X, 323, 324, 326–329, 16/331, 352, 353, 278 X; 52/113, 117, 167.5, 52/167.7; 403/322.4, 348; 244/172.6–172.7, 244/131
See application file for complete search history.

(56) References Cited

U.S. PATENT DOCUMENTS

| | | | | |
|---|---|---|---|---|
| 4,393,541 A * | 7/1983 | Hujsak et al. | ................. | 16/297 |
| 4,501,045 A * | 2/1985 | Boyer | .......................... | 16/331 |
| 4,821,373 A * | 4/1989 | Maidment et al. | ............. | 16/227 |
| 5,098,042 A * | 3/1992 | Viale | ........................ | 244/172.9 |
| 5,356,095 A * | 10/1994 | Aker | ........................ | 244/172.6 |
| 5,479,678 A * | 1/1996 | Reed et al. | .................... | 16/325 |
| 5,673,459 A * | 10/1997 | Baghdasarian | ............... | 16/308 |
| 5,864,320 A * | 1/1999 | Baghdasarian | .............. | 343/757 |
| 6,038,736 A * | 3/2000 | Nygren | ......................... | 16/275 |
| 6,062,527 A * | 5/2000 | Nygren, Jr. | .................. | 248/665 |
| 6,092,264 A * | 7/2000 | Banks | .......................... | 16/321 |
| 6,126,115 A * | 10/2000 | Carrier et al. | ........... | 244/173.3 |
| 6,129,315 A * | 10/2000 | Benoliel et al. | ......... | 244/172.6 |
| 6,158,088 A * | 12/2000 | Bulboaca | ...................... | 16/291 |
| 6,568,032 B1 * | 5/2003 | Ramsauer | ..................... | 16/329 |
| 2002/0194702 A1* | 12/2002 | Hinkley et al. | ............... | 16/260 |
| 2002/0195177 A1* | 12/2002 | Hinkley et al. | ............. | 148/559 |

FOREIGN PATENT DOCUMENTS

EP 694474 A1 * 1/1996
EP 754625 A1 * 1/1997

OTHER PUBLICATIONS

P. Alan Jones, et al., "Spacecraft Solar Array Technology Trends", AEC-Able Engineering Company, Inc., undated, 13 pages, Goleta, California.

* cited by examiner

*Primary Examiner*—Chuck Y. Mah
(74) *Attorney, Agent, or Firm*—McDermott Will & Emery LLP

(57) ABSTRACT

A deployment hinge for deploying an appendage, including a movable portion affixed to the appendage, and a stationary portion affixed to a stationary body. In a non-deployed state, the movable portion is mechanically engaged with the stationary portion and a mechanical load is transferred between the stationary portion and the movable portion. In a deployed state, the movable portion is mechanically disengaged from the stationary portion, and a mechanical load is prevented from being transferred to the movable portion from the stationary portion.

13 Claims, 12 Drawing Sheets

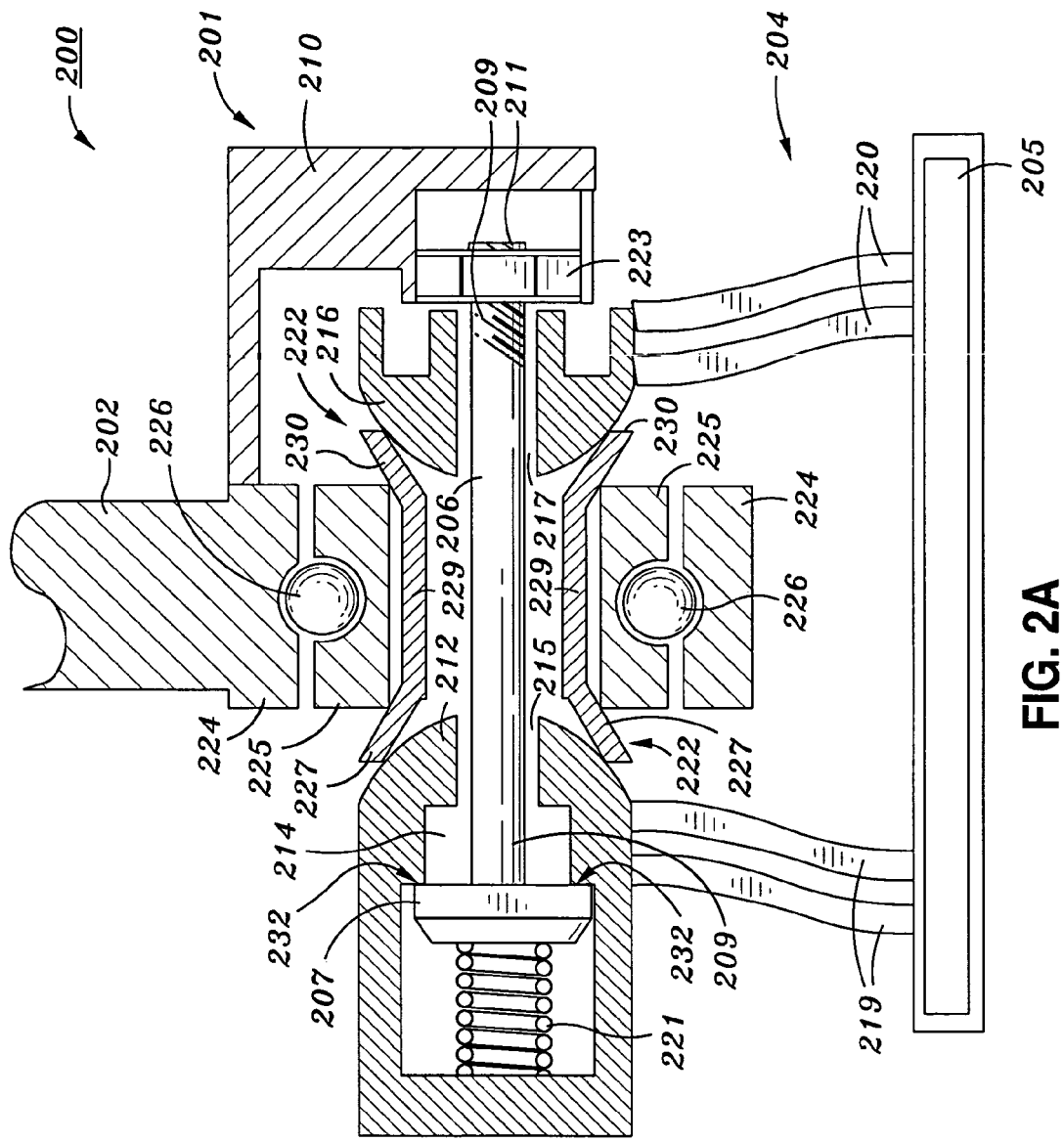
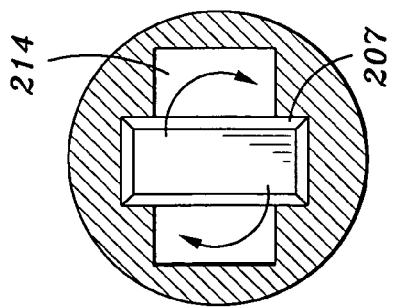
FIG. 2A
FIG. 2B

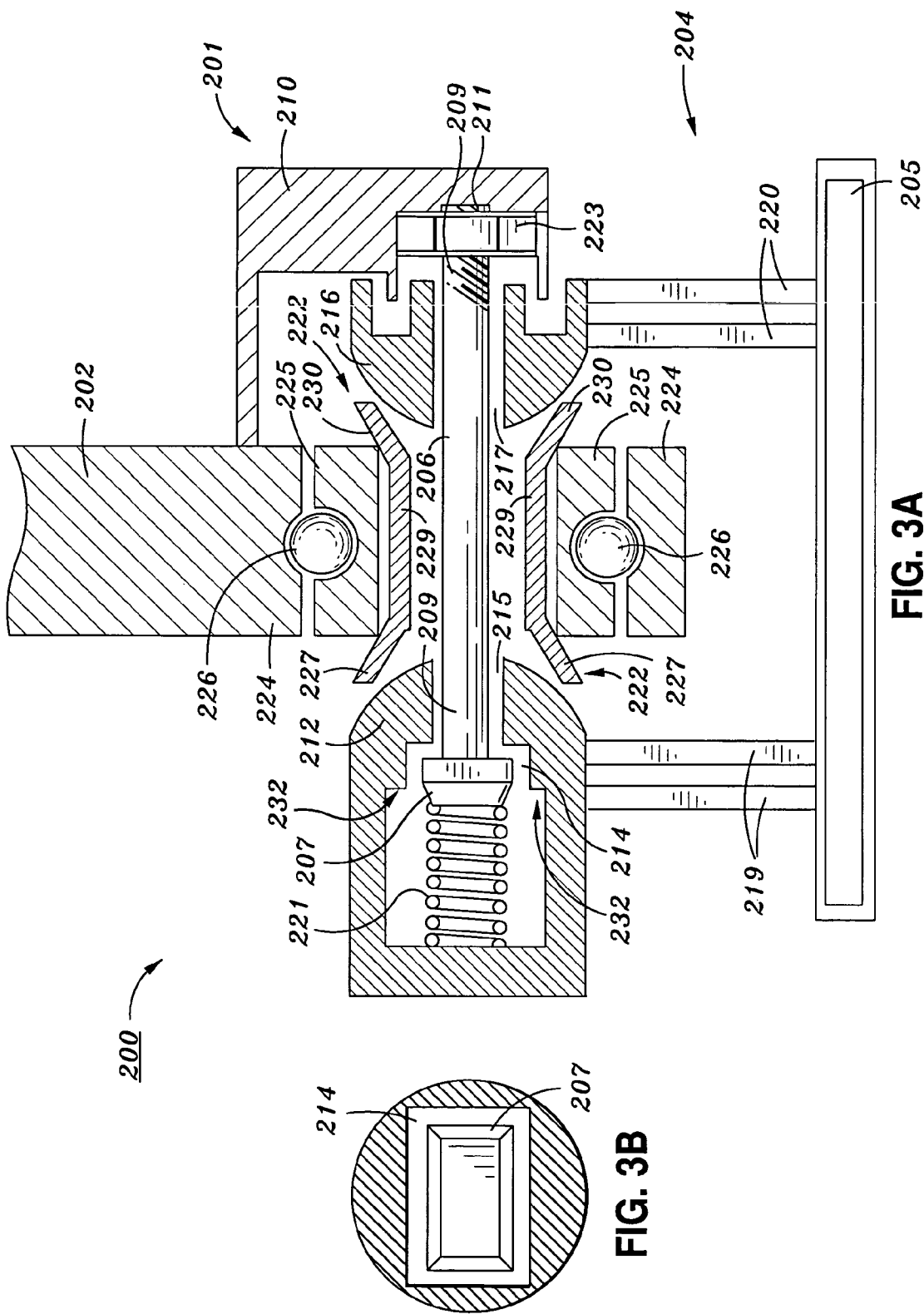

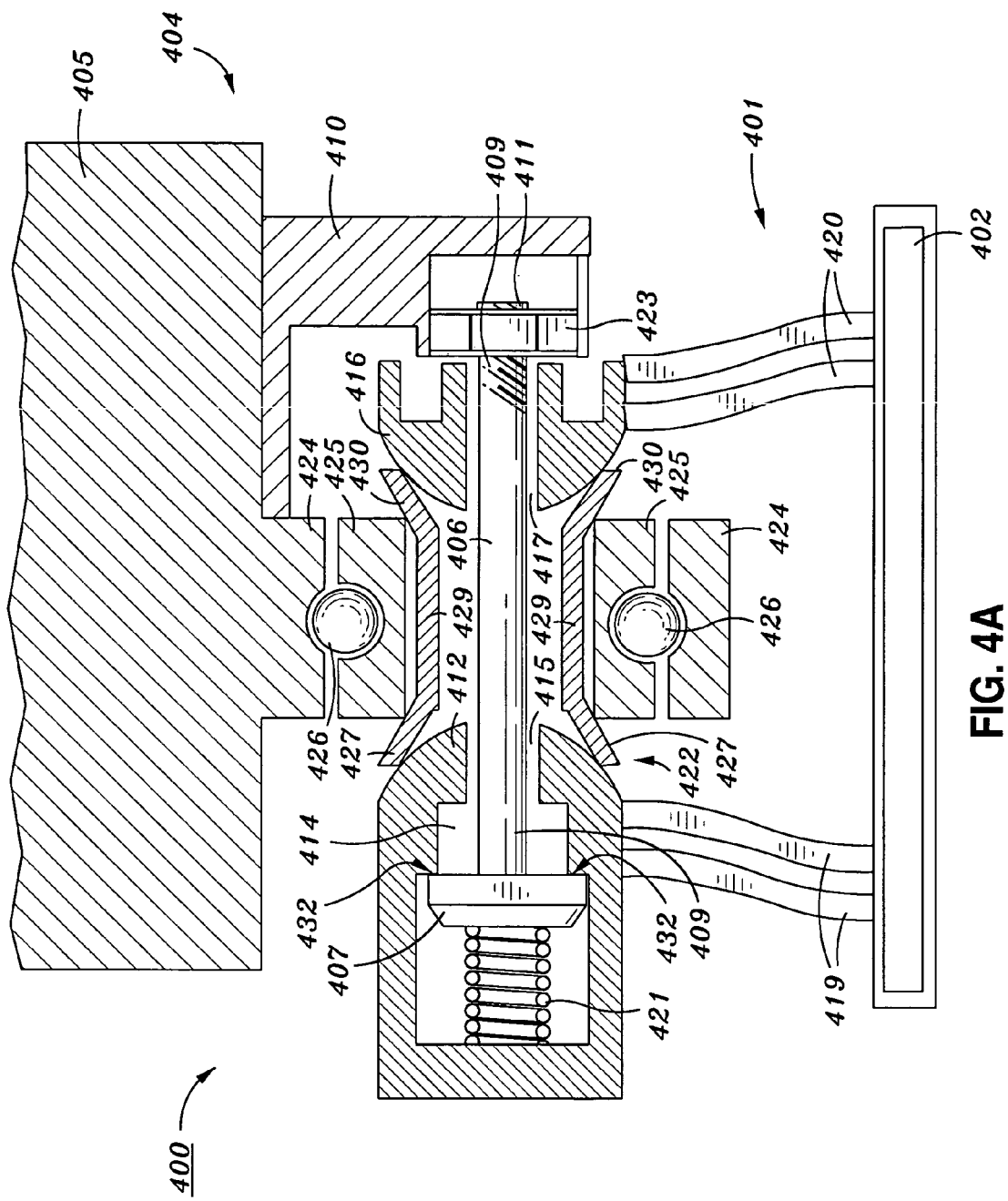
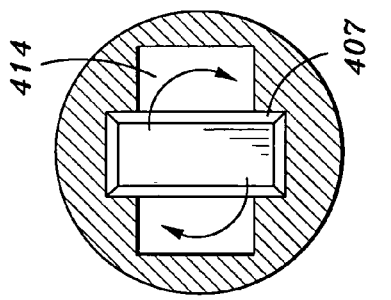
FIG. 4A
FIG. 4B

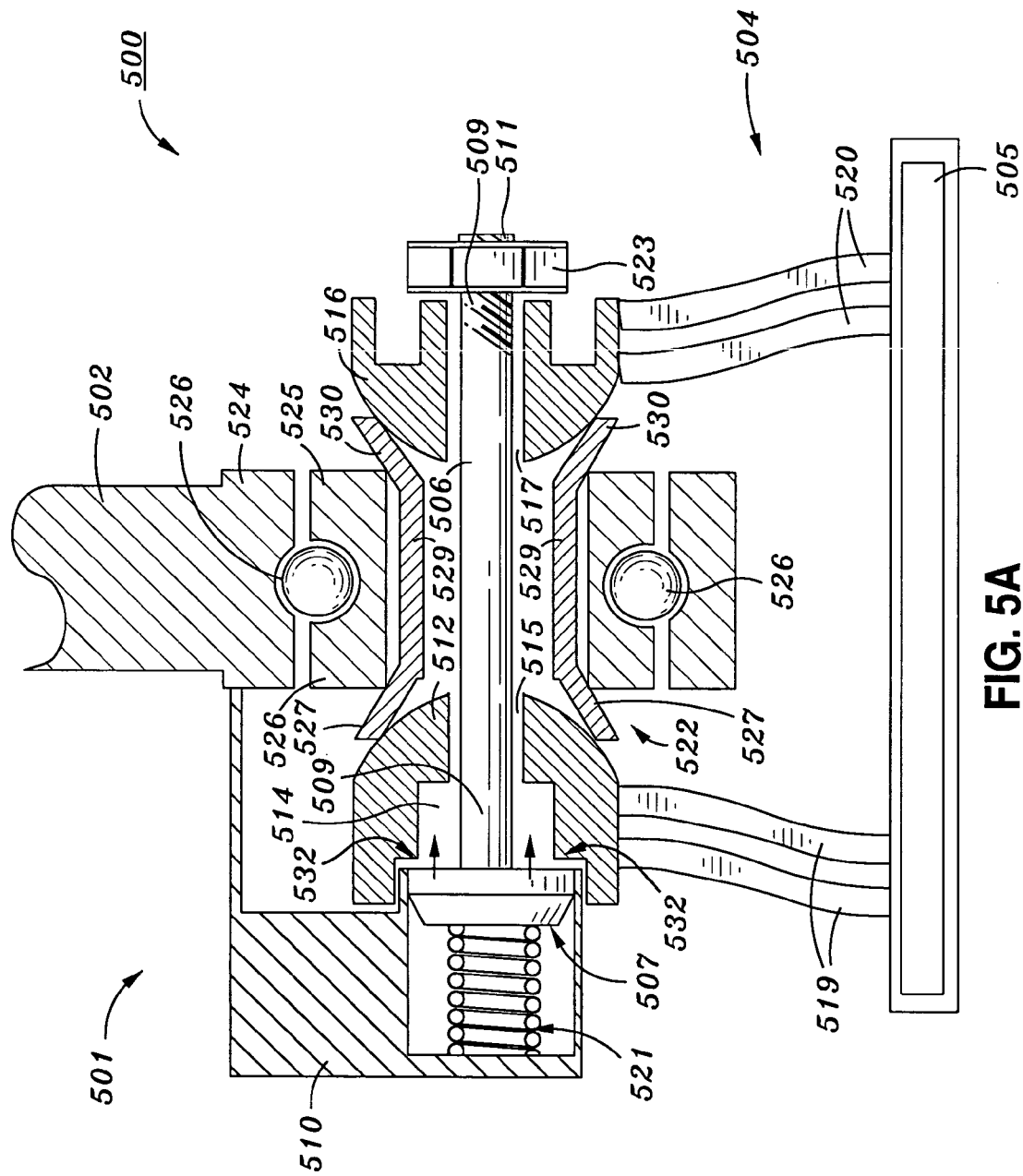
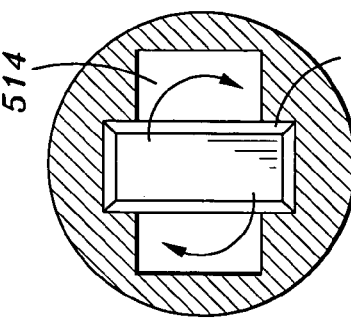
FIG. 5A
FIG. 5B

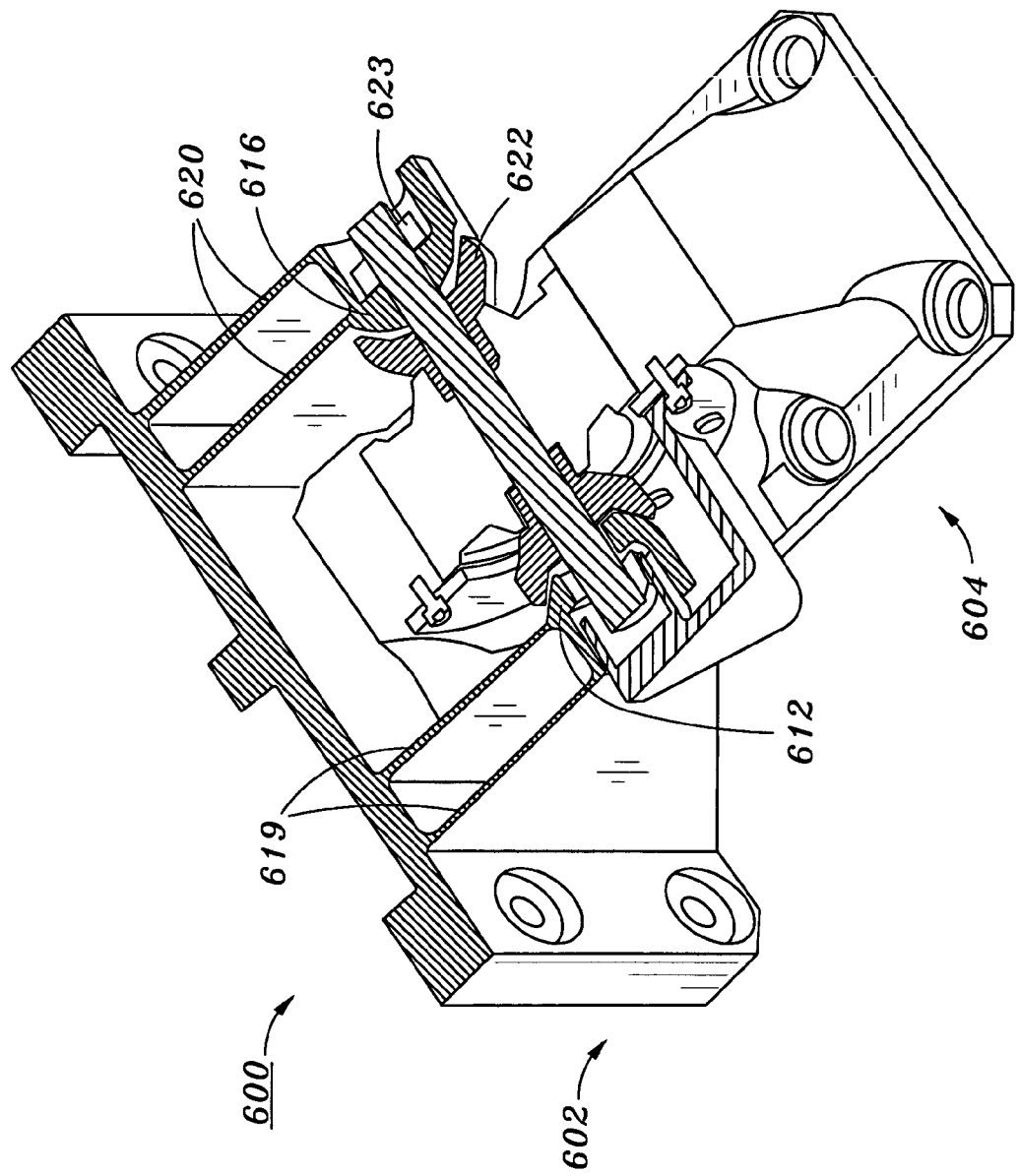

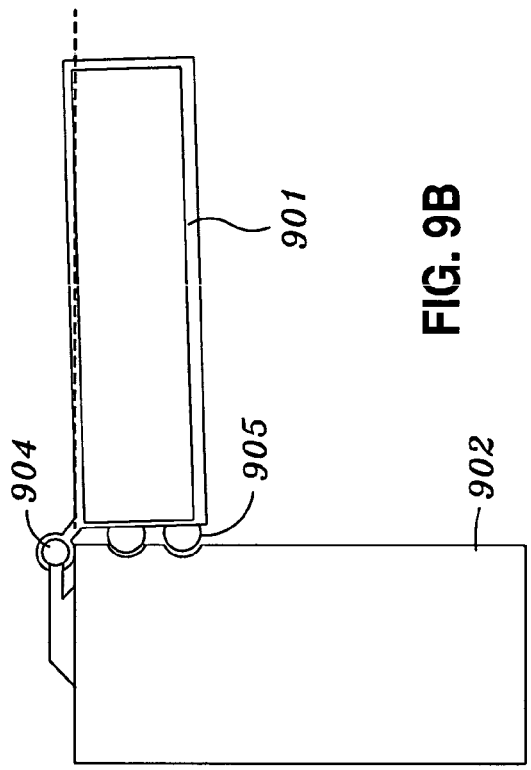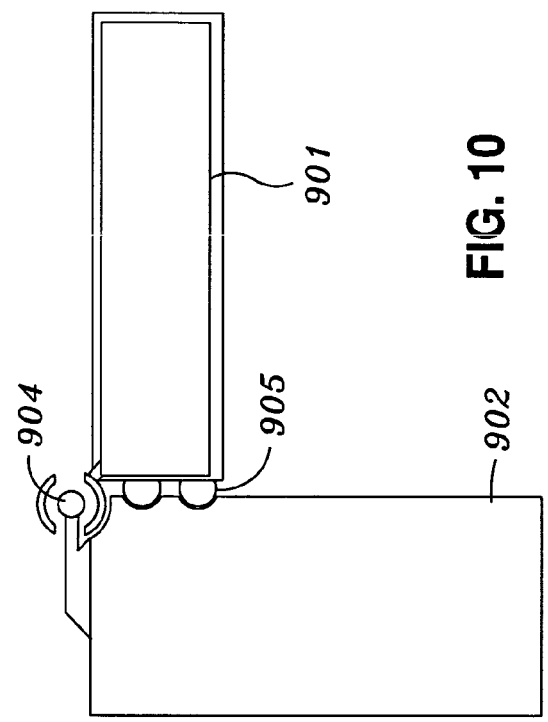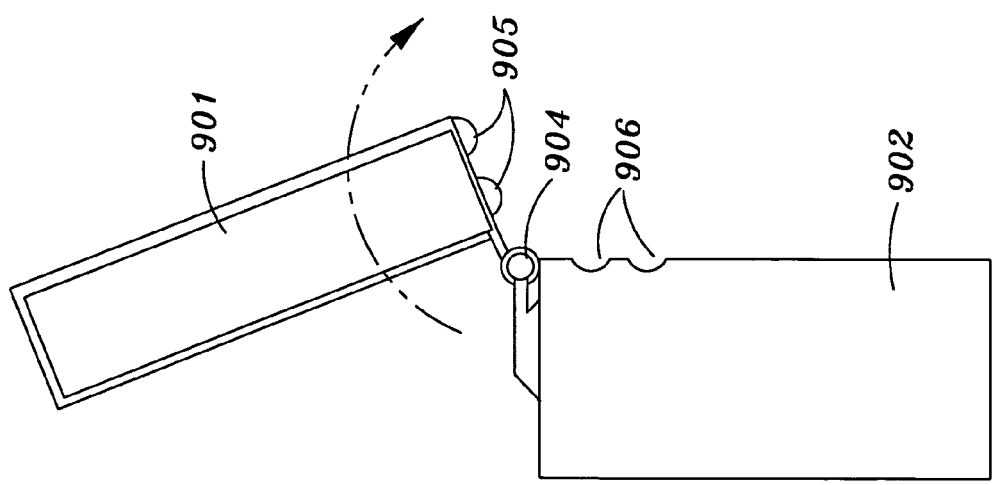

DEPLOYMENT HINGE

STATEMENT AS TO RIGHTS TO INVENTIONS MADE UNDER FEDERALLY SPONSORED RESEARCH OR DEVELOPMENT

Not Applicable

FIELD OF THE INVENTION

The present invention relates generally to an enhanced deployment hinge, and more particularly relates to a deployment hinge used in a combined hinge-latch system, which permits an appendage to be deployed from a stationary body in a precise and repeatable manner, and which removes the hinge from the mechanical load path of a latched appendage.

BACKGROUND OF THE INVENTION

In the development of satellite technologies, appendage flexibility and configurability often affect the types of missions which can be performed by the satellite and define the variety of environments in which the satellite can operate. As more exotic mission applications are developed, appendages and appendage deployment subsystems are optimized to specifically tailor satellites to particular missions.

One known application in which specialized appendages have been designed relates to optical systems. As spacecraft capabilities and mission applications require increased optical capabilities, large, multi-panel, sun-oriented deployable optical elements have been developed. The development of deployable systems has further necessitated a conventional engineering solution to deploy photovoltaic arrays or other appendages, such as mirrors, in an extremely precise yet highly repeatable manner. See, e.g., P. Alan Jones & Brian R. Spence, *Spacecraft Solar Array Technology Trends*, available at <http://www.aec-able.com/corpinfo/Resources/PAJ-IEEE-98.pdf> (last visited Jun. 16, 2004).

Conventional appendage deployment systems utilize a combination of highly rigid hinges and latches to deploy appendages with a high degree of precision. When deployed, these appendages are positioned and oriented very accurately relative to the main spacecraft body. In theory, the combination of the hinge axis of rotation and the position of the latch when closed should supply adequate rigidity and repeatability, required by the latest generation of spacecraft with large, deployable appendages.

In practice, however, it is difficult and expensive to build conventional rigid hinge-latch systems which can provide the rotational capability needed prior to full deployment, along with the precision and rigidity required following deployment. Furthermore, it is extremely difficult and time consuming to install conventional hinges of this type on the spacecraft with their rotation axes correctly aligned so the appendages do not bind during deployment. Conventional precision hinges also tend to have extremely tight mechanical tolerances in order to minimize any free-play, making them even more expensive to manufacture, and also causing high rotational friction levels. Finally, conventional rigid hinges are highly susceptible to damage, since their precision mechanisms often cannot handle high launch load stresses.

FIG. 1 depicts a conventional deployment hinge, in a state where the hinge has fully deployed an appendage. Specifically, conventional deployment hinge 101 is permanently mounted on satellite 102, and appendage 104 has been deployed by fully opening deploying conventional deployment hinge 101, so that appendage 104 rests against satellite 102. The arrows depicted at the center of appendage 104 illustrate residual forces and torques caused by conventional deployment hinge 101, due to the lingering physical contact between conventional deployment hinge 101 and appendage 104. These lingering residual forces affect the precise positioning of appendage 104. In the case where appendage 104 is a photovoltaic solar cell array or mirror, these lingering forces can degrade operational capabilities and prevent satellite 102 from successfully performing a mission.

It is therefore considered highly desirable to provide an improved apparatus for repeatedly and accurately deploying an appendage. In particular, it is desirable to provide an enhanced deployment hinge which allows a hinge to be removed from the mechanical load path of the deployed, latched appendage, without interference from residual forces or torques associated with the hinge.

SUMMARY OF THE INVENTION

The present invention relates generally to an enhanced deployment hinge, and more particularly relates to a deployment hinge used in a combined hinge-latch system, which permits an appendage to be deployed from a stationary body in a precise and repeatable manner, and which removes the hinge from the mechanical load path of a latched appendage.

According to one aspect, the present invention is a deployment hinge for deploying an appendage, including a movable portion affixed to the appendage, and a stationary portion affixed to a stationary body. In a non-deployed state, the movable portion is mechanically engaged with the stationary portion and a mechanical load is transferred between the stationary portion and the movable portion. In a deployed state, the movable portion is mechanically disengaged from the stationary portion and a mechanical load is prevented from being transferred to the movable portion from the stationary portion.

This specialized deployment hinge is designed to work in conjunction with a latch, such as a proprietary Lockheed-Martin latch. The combined hinge-latch system permits the deployment and precision latching of an appendage or appendages requiring an extremely precise and repeatable deployed position and orientation relative to a main spacecraft body.

In one arrangement of the deployment hinge, the movable portion further includes an inner axle, a key affixed to a first end of the inner axle, and a trigger affixed to a second end of the inner axle obverse to the first end, for rotating the inner axle.

Additionally, the stationary portion further includes a first sphere having a cavity in which the key is disposed, the first end of the inner axle passing through an enclosed keyhole and a first opening in the first sphere. The stationary portion also includes a second sphere having a second opening which the second end of the inner axle passes through. The stationary portion further includes a first flexure pair connecting the stationary body to the first sphere, and a second flexure pair connecting the stationary body to the second sphere.

In the non-deployed state, the first flexure pair exerts force on the first sphere away from the second sphere on an axis defined by the inner axle, and the second flexure pair exerts force on the second sphere away from the first sphere on the axis defined by the inner axle, while the key rests on a ledge in the first sphere so as to push the first sphere and the second sphere toward each other. In the deployed state, the key is released from the ledge and interlocks with the enclosed keyhole in the first sphere so as to allow the first sphere and the second sphere to be pushed apart from each other.

The hinge design allows it to be completely removed (or "disengaged") from the mechanical load path of the deployed, latched appendage. The position and orientation of the deployed appendage is then solely determined by the latches, without interference from residual forces or torques associated with the hinges.

The stationary portion further includes an assist spring disposed between an interior wall of the first sphere and the key, for pushing the key into the enclosed keyhole. In the deployed state, the assist spring pushes the key into the enclosed keyhole. The moveable portion further comprises a threaded nut, where the second end is threaded, and where the threaded nut is threaded onto the second end, causing the first flexure pair and the second flexure pair to flex inward, in the non-deployed state.

The movable portion further includes an outer axle located around the inner axle, where the outer axle includes a first conical frustum, a second conical frustum obverse to the first conical frustum, and a narrow portion in physical communication with and between the first conical frustum and the second conical frustum. The movable portion also includes an outer roller bearing ring affixed to the trigger, an inner roller bearing ring in physical communication with and around the narrow portion, and a plurality of bearings in physical communication with and between the outer roller bearing ring and the inner roller bearing ring.

In the non-deployed state, the key holds the first sphere and the second sphere in physical communication with the first conical frustum and the second conical frustum, respectively. In the deployed state, the first flexure pair and the second flexure pair hold the first sphere and the second sphere apart from the outer axle, so that the first sphere and the second sphere are not in physical communication with the first conical frustum and the second conical frustum, respectively.

In an alternative arrangement of the deployment hinge for deploying an appendage, the stationary portion further includes an inner axle, a key affixed to a first end of the inner axle, and a trigger affixed to a second end of the inner axle obverse to the first end.

The movable portion further includes a first sphere having a cavity in which the key is disposed, the first end of the inner axle passing through an enclosed keyhole and a first opening in the first sphere. The movable portion also includes a second sphere having a second opening which the second end of the inner axle passes through. The movable portion further includes a first flexure pair connecting the appendage to the first sphere, and a second flexure pair connecting the appendage to the second sphere.

In the non-deployed state, the first flexure pair exerts force on the first sphere away from the second sphere on an axis defined by the inner axle, and the second flexure pair exerts force on the second sphere away from the first sphere on the axis defined by the inner axle, while the key rests on a ledge in the first sphere so as to push the first sphere and the second sphere toward each other. In the deployed state, the key is released from the ledge and interlocks with the enclosed keyhole in the first sphere so as to allow the first sphere and the second sphere to be pushed apart from each other.

The movable portion further includes an assist spring disposed between an interior wall of the first sphere and the key, for pushing the key into the enclosed keyhole. In the deployed state, the assist spring pushes the key into the enclosed keyhole.

The stationary portion further includes an outer axle located around the inner axle, including a first conical frustum, a second conical frustum obverse to the first conical frustum, and a narrow portion in physical communication with and between the first conical frustum and the second conical frustum. The stationary portion also includes an outer roller bearing ring affixed to the trigger, an inner roller bearing ring in physical communication with and around the narrow portion of the outer axle, and a plurality of bearings in physical communication with and between the outer roller bearing ring and the inner roller bearing ring.

In the non-deployed state, the key holds the first sphere and the second sphere in physical communication with the first conical frustum and the second conical frustum, respectively. In the deployed state, the first flexure pair and the second flexure pair hold the first sphere and the second sphere apart from the outer axle, so that the first sphere and the second sphere are not in physical communication with the first conical frustum and the second conical frustum, respectively.

According to an additional arrangement, the movable portion further includes an inner axle, a key affixed to a first end of the inner axle, and a trigger affixed to the key, for rotating the inner axle.

The stationary portion further includes a first sphere, the first end of the inner axle passing through an interior keyhole and a first opening in the first sphere, and a second sphere having a second opening which a second end of the inner axle, obverse to the first end, passes through. The stationary portion also includes a first flexure pair connecting the stationary body to the first sphere, and a second flexure pair connecting the stationary body to the second sphere.

In the non-deployed state, the first flexure pair exerts force on the first sphere away from the second sphere on an axis defined by the inner axle, and the second flexure pair exerts force on the second sphere away from the first sphere on the axis defined by the inner axle, while the key rests on a ledge in the first sphere so as to push the first sphere and the second sphere toward each other. In the deployed state, the key is released from the ledge and interlocks with the interior keyhole in the first sphere so as to allow the first sphere and the second sphere to be pushed apart from each other.

The stationary portion further includes an assist spring disposed between the trigger and the key, for pushing the key into the interior keyhole. In the deployed state, the assist spring pushes the key into the interior keyhole.

The movable portion further includes an outer axle located around the inner axle, including a first conical frustum, a second conical frustum obverse to the first conical frustum, and a narrow portion in physical communication with and between the first conical frustum and the second conical frustum. The movable portion also includes an outer roller bearing ring affixed to the trigger, an inner roller bearing ring in physical communication with and around the narrow portion, and a plurality of bearings in physical communication with and between the outer roller bearing ring and the inner roller bearing ring.

In the non-deployed state, the key holds the first sphere and the second sphere in physical communication with the first conical frustum and the second conical frustum, respectively. In the deployed state, the first flexure pair and the second flexure pair hold the first sphere and the second sphere apart from the outer axle, so that the first sphere and the second sphere are not in physical communication with the first conical frustum and the second conical frustum, respectively.

In a further additional arrangement, the stationary portion further includes an inner axle, a key affixed to a first end of the inner axle, and a trigger affixed to the first end.

The movable portion further includes a first sphere in which the key is disposed, the first end of the inner axle passing through an interior keyhole and a first opening in the first sphere, and a second sphere having a second opening which the second end of the inner axle, obverse to the first end, passes through. The movable portion also includes a first flexure pair connecting the appendage to the first sphere, and a second flexure pair connecting the appendage to the second sphere.

In the non-deployed state, the first flexure pair exerts force on the first sphere away from the second sphere on an axis defined by the inner axle, and the second flexure pair exerts force on the second sphere away from the first sphere on the axis defined by the inner axle, while the key rests on a ledge in the first sphere so as to push the first sphere and the second sphere toward each other. In the deployed state, the key is released from the ledge and interlocks with the interior keyhole in the first sphere so as to allow the first sphere and the second sphere to be pushed apart from each other.

The movable portion further includes an assist spring disposed between the trigger and the key, for pushing the key into the interior keyhole. In the deployed state, the assist spring pushes the key into the interior keyhole.

The stationary portion further includes an outer axle located around the inner axle, including a first conical frustum, a second conical frustum obverse to the first conical frustum, and a narrow portion in physical communication with and between the first conical frustum and the second conical frustum. The stationary portion also includes an outer roller bearing ring affixed to the trigger, an inner roller bearing ring in physical communication with and around the narrow portion, and a plurality of bearings in physical communication with and between the outer roller bearing ring and the inner roller bearing ring. In the non-deployed state, the key holds the first sphere and the second sphere in physical communication with the first conical frustum and the second sphere, respectively. In the deployed state, the first flexure pair and the second flexure pair hold the first sphere and the second sphere apart from the outer axle, so that the first sphere and the second sphere are not in physical communication with the first conical frustum and the second conical frustum, respectively.

The stationary body is a satellite, and the appendage is a photovoltaic solar array, a mirror, an antenna mast, or a boom. The movable portion and/or the stationary portion are comprised of aluminum, titanium, beryllium, stainless steel, or aluminum beryllium.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings in which like reference numbers represent corresponding parts throughout:

FIGS. 2A and 2B are schematic diagrams of an enhanced deployment hinge and a key, respectively, according to one embodiment of the present invention, in a state where the appendage is non-deployed;

FIGS. 3A and 3B are schematic diagram of the FIG. 2 enhanced deployment hinge and the key, respectively, in state where the appendage is deployed;

FIGS. 4A and 4B are schematic diagrams of the enhanced deployment hinge and a key, respectively, according to a second embodiment of the present invention, in a state where the appendage is non-deployed;

FIGS. 5A and 5B are schematic diagrams of the enhanced deployment hinge and a key, respectively, according to a third embodiment of the present invention, in a state where the appendage is non-deployed;

FIG. 7 is cut-away view of the FIG. 4A enhanced deployment hinge;

FIGS. 9A and 9B are side view depictions of a combined hinge-latch system which utilizes the enhanced deployment hinge according to the present invention, in a state where the appendage is in the process of being deployed;

FIG. 10 is a side view of the combined hinge-latch system which utilizes the enhanced deployment hinge according to the present invention, in a state where the appendage is fully deployed;

DETAILED DESCRIPTION OF THE INVENTION

Figure 1:
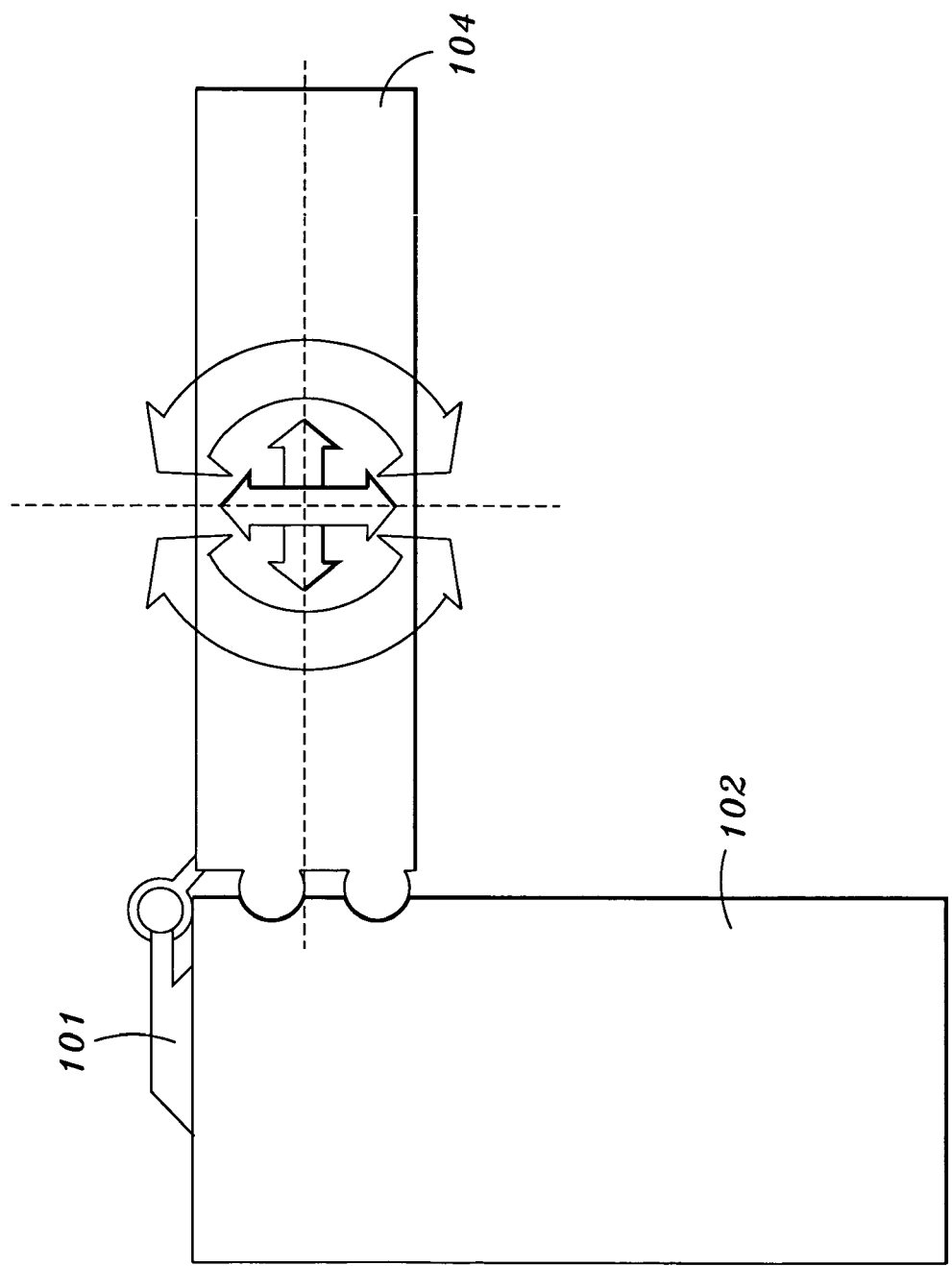
FIG. 1 depicts a conventional deployment hinge, in a state where the hinge has fully deployed an appendage.

The present invention relates generally to an enhanced deployment hinge, and more particularly relates to a combined hinge-latch system which permits a hinge which is mounted to a stationary body to be removed from the mechanical load path of a deployed, latched hinge.

FIGS. 2A and 2B are schematic diagrams of an enhanced deployment hinge and a key, respectively, according to one embodiment of the present invention, in a state where the appendage is non-deployed. FIGS. 3A and 3B are schematic diagrams of the same enhanced deployment hinge and key, respectively, in state where the appendage is deployed. Briefly, the deployment hinge for deploying an appendage includes a movable portion affixed to the appendage, and a stationary portion affixed to a stationary body. In a non-deployed state, the movable portion is mechanically engaged with the stationary portion and a mechanical load is transferred between the stationary portion and the movable portion. In a deployed state, the movable portion is mechanically disengaged from the stationary portion and a mechanical load is prevented from being transferred to the movable portion from the stationary portion.

Satellite designers have increasingly designed deployable appendages and deployment subsystems to increase the flexibility, configurability and capability of modern satellites. With regard to a combined hinge-latch system, the "deployed" state is defined as the state in which an appendage has been moved from the stowed position into an operational location, and in which the latch capture sequence has completed. Similarly, a "non-deployed" state is defined as any state prior to the "deployed" state, such as a "stowed" state, a "deploying" state, or a state in which the latch capture sequence has commenced but not yet finished.

The movable portion and the stationary portion are "engaged" when the movable portion is a part of the mechanical load of the stationary portion. When "disengaged," the movable portion is removed from the mechanical load path of the stationary portion, such that the position and orientation of the deployed appendage is determined by the latches, without interference from residual forces or torques associated with the enhanced deployment hinge.

In detail, deployment hinge 200 includes movable portion 201 affixed to appendage 202, and stationary portion 204 affixed to stationary body 205. Movable portion 201 further includes inner axle 206, key 207 affixed to first end 209 of inner axle 206, and trigger 210 affixed to second end 211 of inner axle 206 obverse to first end 209, for rotating inner axle 206. Additionally, stationary portion 204 further includes first sphere 212 having a cavity in which key 207 is enclosed, first end 209 of inner axle 206 passing through enclosed keyhole 214 and first opening 215 in first sphere 212. Stationary portion 204 also includes second sphere 216 having second opening 217 which second end 211 of inner axle 206 passes through. Stationary portion 204 also includes first flexure pair 219 connecting stationary body 205 to first sphere 212, and second flexure pair 220 connecting stationary body 205 to second sphere 216.

Although stationary portion 204 and stationary body 205 are described as "stationary," this term is merely used to describe the fixed position of these components relative to moving components, such as movable portion 201. Indeed, according to one aspect of the invention, stationary body 205 is a satellite, and may travel at great speeds.

In the non-deployed state, first flexure pair 219 exerts force on first sphere 212 away from second sphere 216 on an axis defined by inner axle 206, and second flexure pair 220 exerts force on second sphere 216 away from first sphere 212 on the axis defined by the inner axle 206, while key 207 rests on ledge 232 in first sphere 212 so as to push first sphere 212 and second sphere 216 toward each other. In the deployed state, key 207 is released from ledge 232 and interlocks with enclosed keyhole 214 in first sphere 212 so as to allow first sphere 212 and second sphere 216 to be pushed apart from each other. Deployment hinge 200 uses pre-loaded flexures (i.e. first flexure pair 219 and second flexure pair 220) to provide mechanical separation of hinge components at the completion of the deployment cycle.

First flexure pair 219 forms a four-bar linkage with stationary body 205 and first sphere 212, and second flexure pair 220 forms a four-bar linkage with the stationary body 205 and second sphere 216. A four-bar linkage is essentially a floating parallelogram, featuring joined four bars (the two flexure pair bars, the stationary body bar, and the sphere bar). A four-bar linkage design allows for the spheres to achieve relatively long travel, effectuating the interlock between key 207 and keyhole 214. The enhanced deployment hinge depicted in FIG. 2A is designed to work with a latch, such as a proprietary Lockheed-Martin latch, to permit the deployment and precision latching of an appendage requiring an extremely precise and repeatable deployed position and orientation relative to the stationary body.

Although conventional rigid hinge-latch systems can theoretically provide the rotational capability needed prior to full deployment, in practice these conventional rigid hinge-latch systems are difficult and expensive to manufacture. The enhanced deployment hinge according to the present invention is not as consuming to install on a spacecraft as a conventional hinge, since the rotation axles do not need to be as precisely aligned. The enhanced deployment hinge also does not suffer from high rotational friction levels, since mechanical tolerances do not have to be as tight as conventional ridged hinges. Finally, the enhanced deployment hinge is not as susceptible to damage as conventional rigid hinges, since the hinge is not deployed during launch, and can therefore cope better with launch load stresses.

The hinge-latch system according to the present invention takes a different approach than conventional rigid hinge-latch systems. The enhanced deployment hinge is used merely as a guide to get the appendage from the non-deployed position into the approximate deployed position. In this "almost completely deployed" position the latching sequence can be initiated. The three latches in the Lockheed hinge-latch system provide the highly precise positioning and orientation for the appendage. The hinges, which are self-aligning and are fabricated from off-the-shelf spherical roller bearings, are non-precision, extremely rugged, lightweight, simple to fabricate and assemble, and relatively inexpensive. The enhanced deployment hinge has a maximum load carrying capability of at least 25,000 lbs per deployment hinge pair.

Stationary portion 204 further includes assist spring 221 disposed between an interior wall of first sphere 212 and key 207, for pushing key 207 into enclosed keyhole 214. In the deployed state, assist spring 221 pushes key 207 into enclosed keyhole 214. In a further aspect, assist spring 221 is omitted, and key 207 interlocks with enclosed keyhole 214 in the deployed state when flexure pair 219 dislocates first sphere 212.

Moveable portion 201 further includes threaded nut 223, where second end 211 is threaded, and where threaded nut 223 is threaded onto second end 211, causing first flexure pair 219 and second flexure pair 220 to flex inward, in the non-deployed state.

The hinge design allows it to be completely "removed" from the mechanical load path of the deployed appendage. The position and orientation of the deployed appendage is then solely determined by the latches, without interference from residual forces or torques associated with the hinges.

Movable portion 201 further includes outer axle 222 located around inner axle 206, including first conical frustum 227, second conical frustum 230 obverse to first conical frustum 227, and narrow portion 229 in physical communication with and between first conical frustum 227 and second conical frustum 230. Movable portion 201 also includes outer roller bearing ring 224 affixed to trigger 202, inner roller bearing ring 225 in physical communication with and around narrow portion 229 of outer axle 222, and a plurality of bearings 226 in physical communication with and between outer roller bearing ring 224 and inner roller bearing ring 225. In the non-deployed state, key 207 holds first sphere 212 and second sphere 216 in physical communication with first conical frustum 227 and second conical frustum 230, respectively. In the deployed state, first flexure pair 219 and second flexure pair 220 hold first sphere 212 and second sphere 216 apart from outer axle 222, so that first sphere 212 and second sphere 216 are not in physical communication with first conical frustum 227 and second conical frustum 230, respectively.

First sphere 212 and second sphere 216 are held in contact with first conical frustum 227 and second conical frustum 230 in the non-deployed state, forming a double sphere-in-cone interface and providing a rigid axle for hinge rotation during deployment. A sphere-in-cone interface is a precise and repeatable mechanical linking, since a sphere fits in a cone easily, with no mating or fit issues, in a simple, direct mechanical fashion. Furthermore, the preloaded mechanical contact between the spheres and the conical surface provides an extremely stiff line contact when the hinge is in the non-deployed (or "cocked") state.

This invention uses a compact roller bearing as the primary rotary hinge. The bearing rotates on an axle whose ends are firmly attached to the stationary portion of the hinge by a flexure-spring mechanism. When the hinge has rotated from the "stow" orientation into the "deployed" orientation, the flexure-spring causes the hinge axle to be released. The bearing is then no longer held firmly and the movable portion and the stationary portion of the deployment hinge can move relative to one another. The hinge release mechanism is designed so that the release action does not commence until the appendage is deployed and the latches are in the process of engaging. As the latch capture sequence finishes, the hinge is completely released. The fully-deployed appendage is held in position solely by the precision latches without any additional mechanical interference from the hinges.

Components for the enhanced deployment hinge can be constructed of a variety of materials, depending on the individual mission application. Possible materials include aluminum, titanium, beryllium, stainless steel, or aluminum beryllium ("AlBeMet").

FIGS. 4A and 4B are schematic diagrams of an enhanced deployment hinge and a key, according to a second embodiment of the present invention, in a state where the appendage is non-deployed. Although there are several similarities to the FIG. 2A embodiment, the enhanced deployment hinge depicted in FIG. 4A includes a movable portion affixed to the appendage, and a stationary portion affixed to a stationary body. In a non-deployed state, the movable portion is mechanically engaged with the stationary portion and a mechanical load is transferred between the stationary portion and the movable portion. In a deployed state, the movable portion is mechanically disengaged from the stationary portion and a mechanical load is prevented from being transferred to the movable portion from the stationary portion.

In more detail, deployment hinge 400 includes movable portion 401 affixed to appendage 402, and stationary portion 404 affixed to stationary body 405. Deployment hinge 400 is similar in structure and operation to deployment hinge 200 (depicted in FIGS. 2 and 3), however the "movable" and "stationary" components of each of these deployment hinges are reversed. Specifically, although both embodiments include a plurality of flexure pairs, in the FIG. 2A embodiment the plurality of flexure pairs connects a plurality of spheres to the stationary body. In contrast, in the FIG. 4A embodiment the plurality of flexure pairs connects the plurality of spheres to the movable body.

Referring back to FIG. 4, stationary portion 404 includes inner axle 406, key 407 affixed to first end 409 of inner axle 406, and trigger 410 affixed to second end 411 of inner axle 406 obverse to first end 409. Additionally, movable portion 401 further includes first sphere 412 having a cavity in which key 407 is disposed, first end 409 of inner axle 406 passing through enclosed keyhole 414 and first opening 415 in first sphere 412. Movable portion 401 also includes second sphere 416 having second opening 417 which second end 411 of inner axle 406 passes through. Movable portion 401 includes first flexure pair 419 connecting appendage 402 to first sphere 412, and second flexure pair 420 connecting appendage 402 to second sphere 416.

First flexure pair 419 forms a four-bar linkage with appendage 402 and first sphere 412, and second flexure pair 420 forms a four-bar linkage with the stationary body 405 and second sphere 416. The four-bar linkage features four joined bars (the two flexure bars, the appendage bar, and the sphere bar). The four-bar linkage is designed to allow the spheres to achieve relatively long travel, sufficient to allow key 407 to engage keyhole 414. Pre-loaded flexures, including first flexure pair 419 and second flexure pair 420, provide mechanical separation of the hinge components of deployment hinge 400 at the completion of the deployment cycle.

In the non-deployed state, first flexure pair 419 exerts force on first sphere 412 away from second sphere 416 on an axis defined by inner axle 406, and second flexure pair 420 exerts force on second sphere 416 away from first sphere 412 on the axis defined by inner axle 406, while key 407 rests on ledge 432 in first sphere 412 so as to push first sphere 412 and second sphere 416 toward each other. In the deployed state, key 407 is released from ledge 432 and interlocks with enclosed keyhole 414 in first sphere 412 so as to allow first sphere 412 and second sphere 416 to be pushed apart from each other.

Movable portion 401 further includes assist spring 421 disposed between an interior wall of first sphere 412 and key 407, for pushing key 407 into enclosed keyhole 414. In the deployed state, assist spring 421 pushes key 407 into enclosed keyhole 414.

Stationary portion 404 further includes threaded nut 423, where second end 411 is threaded, and where threaded nut 423 is threaded onto second end 411, causing first flexure pair 419 and second flexure pair 420 to flex inward, in the non-deployed state.

Stationary portion 404 further includes outer axle 422 located around inner axle 406, including first conical frustum 427, second conical frustum 430 obverse to first conical frustum 427, and narrow portion 429 in physical communication with and between first conical frustum 427 and second conical frustum 430. Stationary portion 404 further includes outer roller bearing ring 424 affixed to trigger 410, inner roller bearing ring 425 in physical communication with and around narrow portion 429 of outer axle 422, and a plurality of bearings 426 in physical communication with and between outer roller bearing ring 424 and inner roller bearing ring 425.

In the non-deployed state, key 407 holds first sphere 412 and second sphere 416 in physical communication with first conical frustum 427 and second conical frustum 430. In the deployed state, first flexure pair 419 and second flexure pair 420 hold first sphere 412 and second sphere 416 apart from outer axle 422, so that the first sphere 412 and second sphere 416 are not in physical communication with first conical frustum 427 and second conical frustum 430, respectively.

First sphere 412 and second sphere 416 are held in contact with first conical frustum 427 and second conical frustum 430, respectively, in the non-deployed state, forming a double sphere-in-cone interface and providing a rigid axle for hinge rotation during deployment. A sphere-in-cone interface is a precise and repeatable mechanical linking, since a sphere fits in a cone easily, with no mating or fit issues, in a simple, direct mechanical fashion. The preloaded mechanical contact between the spheres and the conical surface provides an extremely stiff line contact when the hinge is in the non-deployed state.

The above-described enhanced deployment hinges are designed to work in conjunction with latches, such as proprietary Lockheed-Martin latches. The combined hinge-latch system permits the deployment and precision latching of appendages that are required to have an extremely precise and repeatable deployed position and orientation relative to a main spacecraft body or other stationary body. One example application relates to the deployment of "petals" of the 6 meter primary mirror of the Lockheed Martin design for the James Webb Space Telescope.

The stationary body is a satellite, and the appendage is a photovoltaic solar array, a mirror, an antenna mast, or a boom. The movable portion and/or the stationary portion are comprised of aluminum, titanium, beryllium, stainless steel, or aluminum beryllium.

FIGS. 5A and 5B are schematic diagrams of the enhanced deployment hinge and a key, respectively, according to a third embodiment of the present invention, in a state where the appendage is non-deployed. Briefly, the movable portion further includes an inner axle, a key affixed to a first end of the inner axle, and a trigger affixed to the key, for rotating the inner axle.

In more detail, movable portion 501 further includes inner axle 506, key 507 affixed to first end 509 of inner axle 506, and trigger 510 affixed to key 507, for rotating inner axle 506. Stationary portion 504 further includes first sphere 512, first end 509 of inner axle 506 passing through interior keyhole 514 and first opening 515 in first sphere 512, and second sphere 516 having second opening 517 which second end 511 of inner axle 506, obverse to first end 509, passes through. Stationary portion 504 also includes first flexure pair 519 connecting stationary body 504 to first sphere 512, and second flexure pair 520 connecting stationary body 505 to second sphere 516. In the non-deployed state, first flexure pair 519 exerts force on first sphere 512 away from second sphere 516 on an axis defined by inner axle 506, and second flexure pair 520 exerts force on second sphere 516 away from first sphere 512 on the axis defined by inner axle 506, while key 507 rests on ledge 532 in first sphere 512 so as to push first sphere 512 and second sphere 516 toward each other. In the deployed state, key 507 is released from ledge 532 and interlocks with interior keyhole 415 in first sphere 512 so as to allow first sphere 512 and second sphere 516 to be pushed apart from each other.

Stationary portion 504 further includes assist spring 521 disposed between trigger 519 and key 507, for pushing key 507 into interior keyhole 514. In the deployed state, assist spring 521 pushes key 507 into interior keyhole 514.

Moveable portion 501 further includes threaded nut 523, where second end 511 is threaded, and where threaded nut 523 is threaded onto second end 511, causing first flexure pair 519 and second flexure pair 520 to flex inward, in the non-deployed state.

Movable portion 501 further includes outer axle 522 located around inner axle 506, including first conical frustum 527, second conical frustum 530 obverse to first conical frustum 527, and narrow portion 529 in physical communication with and between first conical frustum 527 and second conical frustum 530. Movable portion 501 also includes outer roller bearing ring 524 affixed to trigger 510, inner roller bearing ring 525 in physical communication with and around narrow portion 529, and plurality of bearings 526 in physical communication with and between outer roller bearing ring 524 and inner roller bearing ring 525. In the non-deployed state, key 507 holds first sphere 512 and second sphere 516 in physical communication with first conical frustum 527 and second conical frustum 530, respectively. In the deployed state, first flexure pair 519 and second flexure pair 530 hold first sphere 512 and second sphere 516 apart from outer axle 522, so that first sphere 512 and second sphere 516 are not in physical communication with first conical frustum 527 and second conical frustum 530, respectively.

Figure 6A:
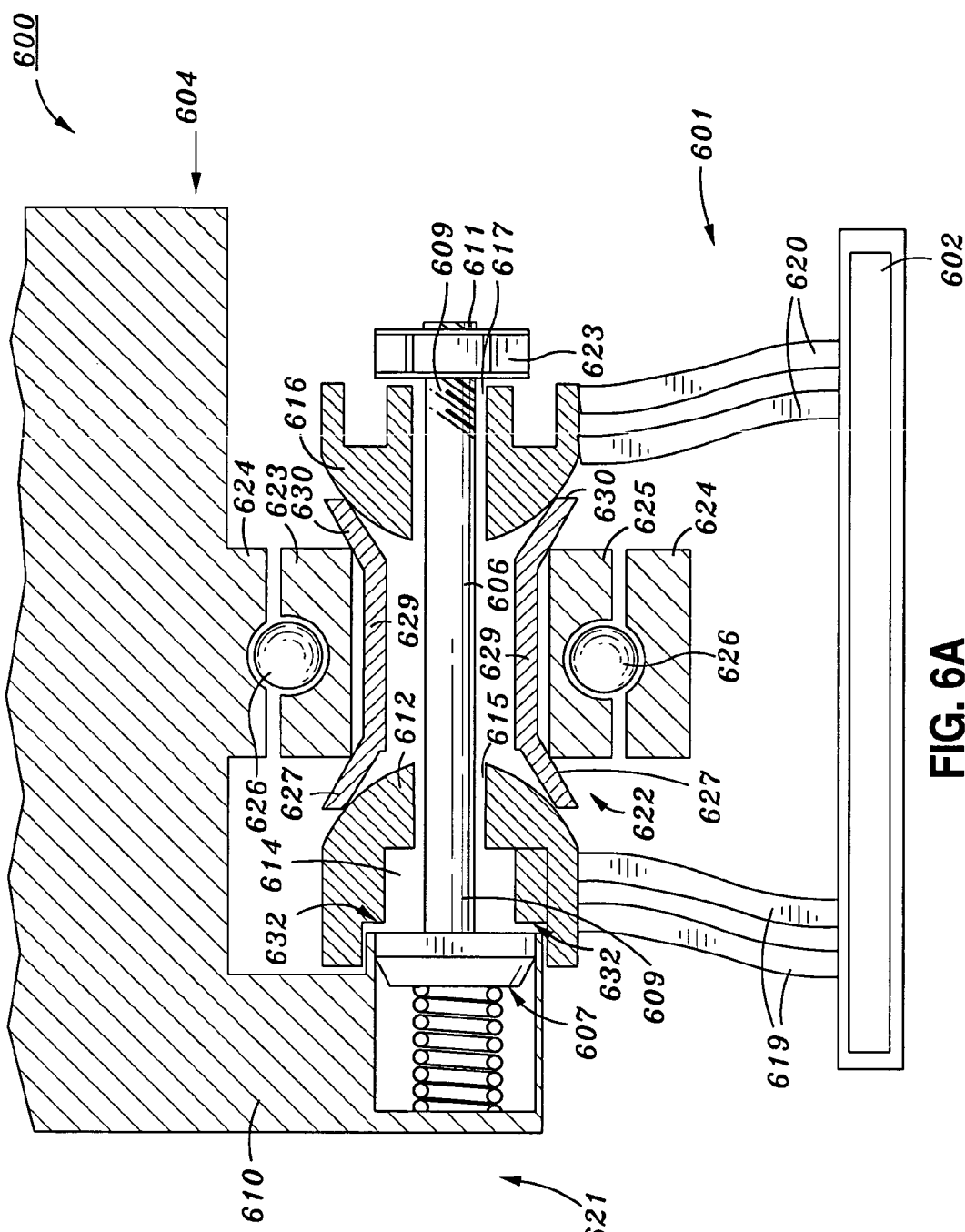
FIGS. 6A and 6B are schematic diagrams of the enhanced deployment hinge and a key, respectively, according to a fourth embodiment of the present invention, in a state where the appendage is non-deployed.
Figure 6B:
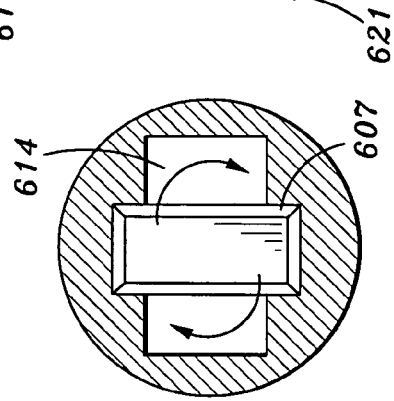

FIGS. 6A and 6B are schematic diagrams of the enhanced deployment hinge and a key, respectively, according to a fourth embodiment of the present invention, in a state where the appendage is non-deployed. Briefly, the stationary portion further includes an inner axle, a key affixed to a first end of the inner axle, and a trigger affixed to the first end.

In more detail, the stationary portion 604 further includes inner axle 606, key 607 affixed to first end 609 of inner axle 606, and trigger 610 affixed to first end 609. Movable portion 601 further includes first sphere 612 in which key 607 is disposed, first end 609 of inner axle 606 passing through interior keyhole 614 and first opening 615 in first sphere 612, and second sphere 616 having second opening 617 which second end 611 of inner axle 606, obverse to first end 609, passes through. Movable portion 601 also includes first flexure pair 619 connecting appendage 602 to first sphere 612, and second flexure pair 620 connecting appendage 602 to second sphere 616. In the non-deployed state, first flexure pair 619 exerts force on first sphere 612 away from second sphere 616 on an axis defined by inner axle 606, and second flexure pair 620 exerts force on second sphere 616 away from first sphere 612 on the axis defined by inner axle 606, while key 607 rests on ledge 632 in first sphere 612 so as to push first sphere 612 and second sphere 616 toward each other. In the deployed state, key 607 is released from ledge 632 and interlocks with interior keyhole 614 in first sphere 612 so as to allow first sphere 612 and second sphere 616 to be pushed apart from each other.

Movable portion 601 further includes assist spring 621 disposed between trigger 610 and key 607, for pushing key 607 into interior keyhole 614. In the deployed state, assist spring 621 pushes key 607 into interior keyhole 614.

Stationary portion 604 further includes threaded nut 623, where second end 611 is threaded, and where threaded nut 623 is threaded onto second end 611, causing first flexure pair 619 and second flexure pair 620 to flex inward, in the non-deployed state.

Stationary portion 604 further includes outer axle 622 located around inner axle 606, including first conical frustum 627, second conical frustum 630 obverse to first conical frustum 627, and narrow portion 629 in physical communication with and between first conical frustum 627 and second conical frustum 630. Stationary portion 604 also includes outer roller bearing ring 624 affixed to trigger 610, inner roller bearing ring 624 in physical communication with and around narrow portion 629, and plurality of bearings 626 in physical communication with and between outer roller bearing ring 624 and inner roller bearing ring 625. In the non-deployed state, key 607 holds first sphere 612 and second sphere 616 in physical communication with first conical frustum 627 and second sphere 616, respectively. In the deployed state, first flexure pair 619 and second flexure pair 620 hold first sphere 612 and second sphere 616 apart from outer axle 622, so that first sphere 612 and second sphere 616 are not in physical communication with first conical frustum 627 and second conical frustum 630, respectively.

Figure 8:
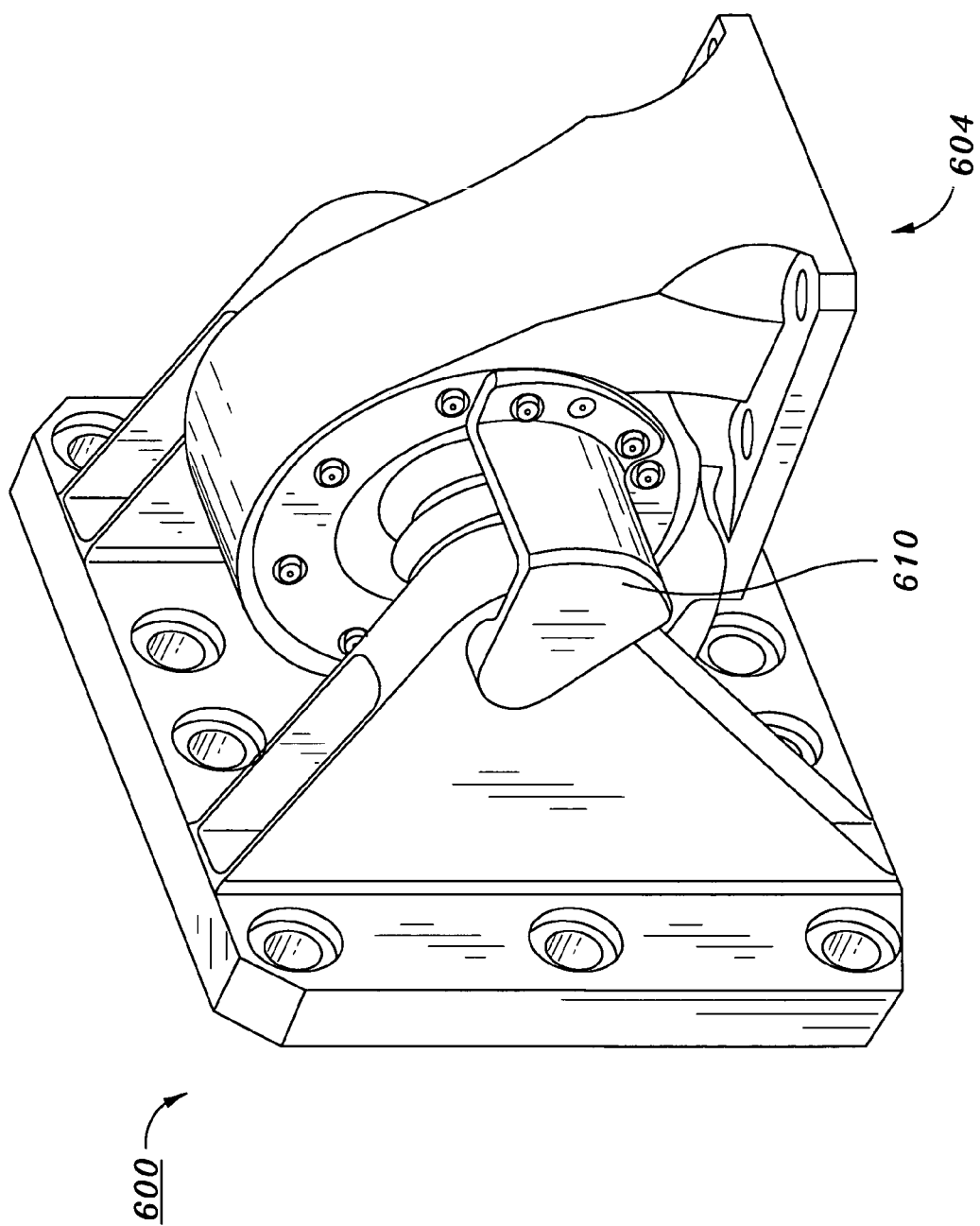
FIG. 8 is a perspective view of the FIG. 4A enhanced deployment hinge.

FIG. 7 is a cut-away view of the FIG. 6A embodiment, clearly depicting the inner-components of deployment hinge 600 in the deployed state. Specifically, in FIG. 7, first flexure pair 619 and second flexure pair 620 are holding first sphere 612 and second sphere 616 apart from outer axle 622, such that movable portion 401 is disengaged, or removed from the mechanical load path of stationary portion 604. Furthermore, FIG. 8 is a perspective view of the FIG. 4A embodiment, illustrating the interface between trigger 610 and stationary portion 604, in the deployed state.

FIGS. 9A and 9B are side view depictions of a combined hinge-latch system which utilizes the enhanced deployment hinge according to the present invention, in a "deploying" state. In further detail, FIG. 9A illustrates appendage 901 leaving the "stowed" state and deploying from stationary body 902, utilizing enhanced deployment hinge 904. In the stage of the process depicted in FIG. 9A, the movable portion of the hinge (unnumbered) attached to appendage 901 is engaged with the stationary portion of the hinge (also unnumbered) attached to the stationary body.

FIG. 9B illustrates the same system much further along the deployment process, in a state where the plurality of latches 905 on appendage 901 have begun to engage latches 906 (depicted here as 'notches') on stationary body 902. Although appendage 901 is starting to become latched to stationary body 902, appendage 901 is not yet fully deployed since the deployment hinge 904 has not yet released appendage 901 from stationary body 902. Specifically, in FIG. 9B the latch capture sequence is starting, and deployment hinge 904 has not yet released appendage 901.

FIG. 10 is a side view of the combined hinge-latch system which utilizes the enhanced deployment hinge according to the present invention, in a state where the appendage is fully deployed. In a deployed state, movable portion 901 is removed from the mechanical load path of stationary portion 902. Specifically, and as described more fully above, the key interlocks with the enclosed keyhole, and the first flexure pair and the second flexure pair hold the first sphere and the second sphere apart from the outer axle. These operations effectuate the disengagement between movable portion 901 and stationary portion 902.

The deployment hinge is designed so that the hinge can be completely removed from the mechanical load path of the deployed appendage. The position and orientation of the deployed appendage is then solely determined by the latches, without interference from residual forces or torques associated with the deployment hinge.

Figure 11:
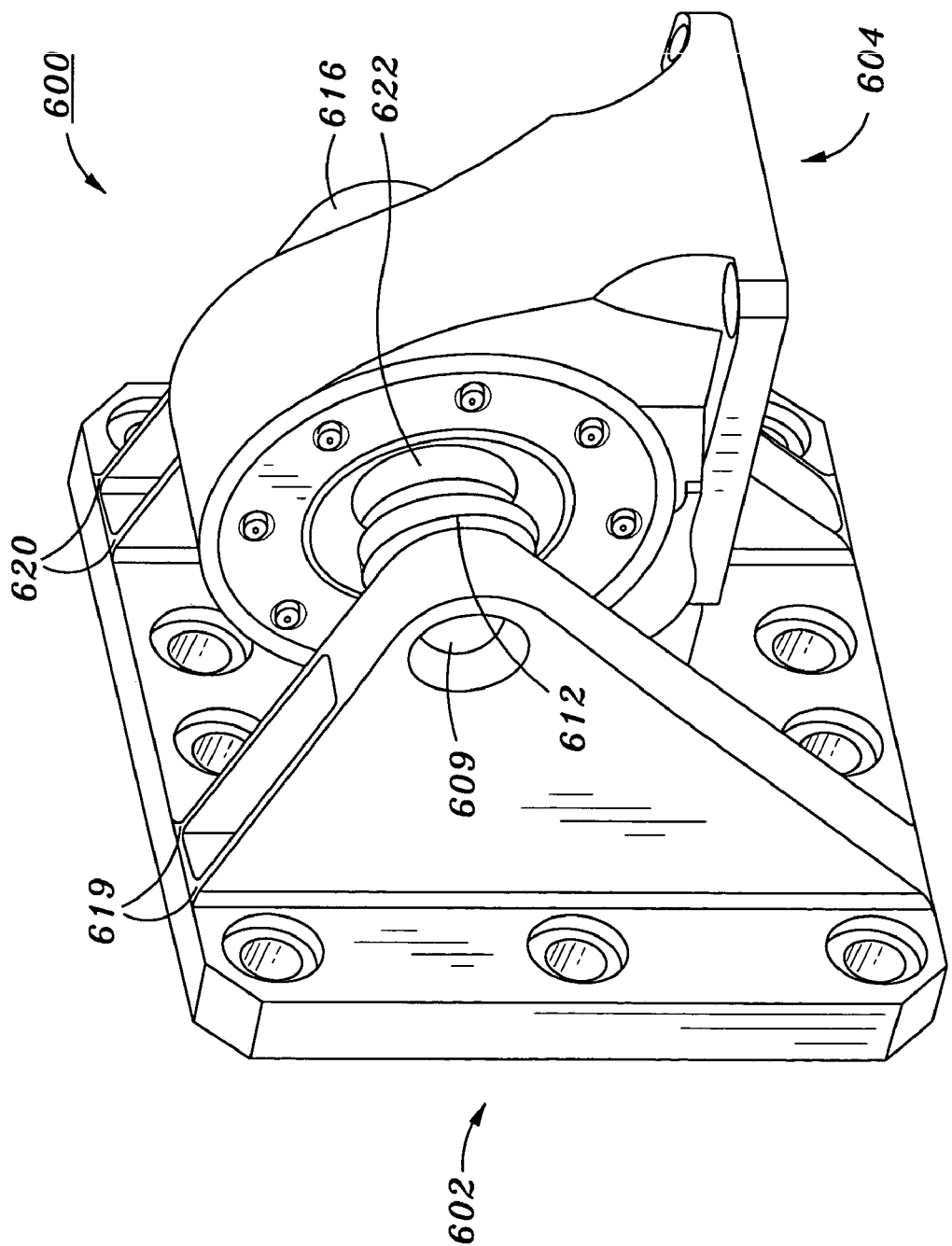
FIG. 11 is a perspective view of the FIG. 4A enhanced deployment hinge, in a state where the trigger has been removed.

FIG. 11 is a perspective view of the FIG. 6A deployment hinge, in a state where the trigger has been removed to show several internal components of the enhanced deployment hinge. Specifically, FIG. 11 depicts first end 609, for rotating the inner axle (not shown), where first end 609 passes through a first opening in first sphere 612. In FIG. 11, first flexure pair 619 and second flexure pair 620 hold first sphere 612 and second sphere 616 apart from outer axle 622.

Figure 12:
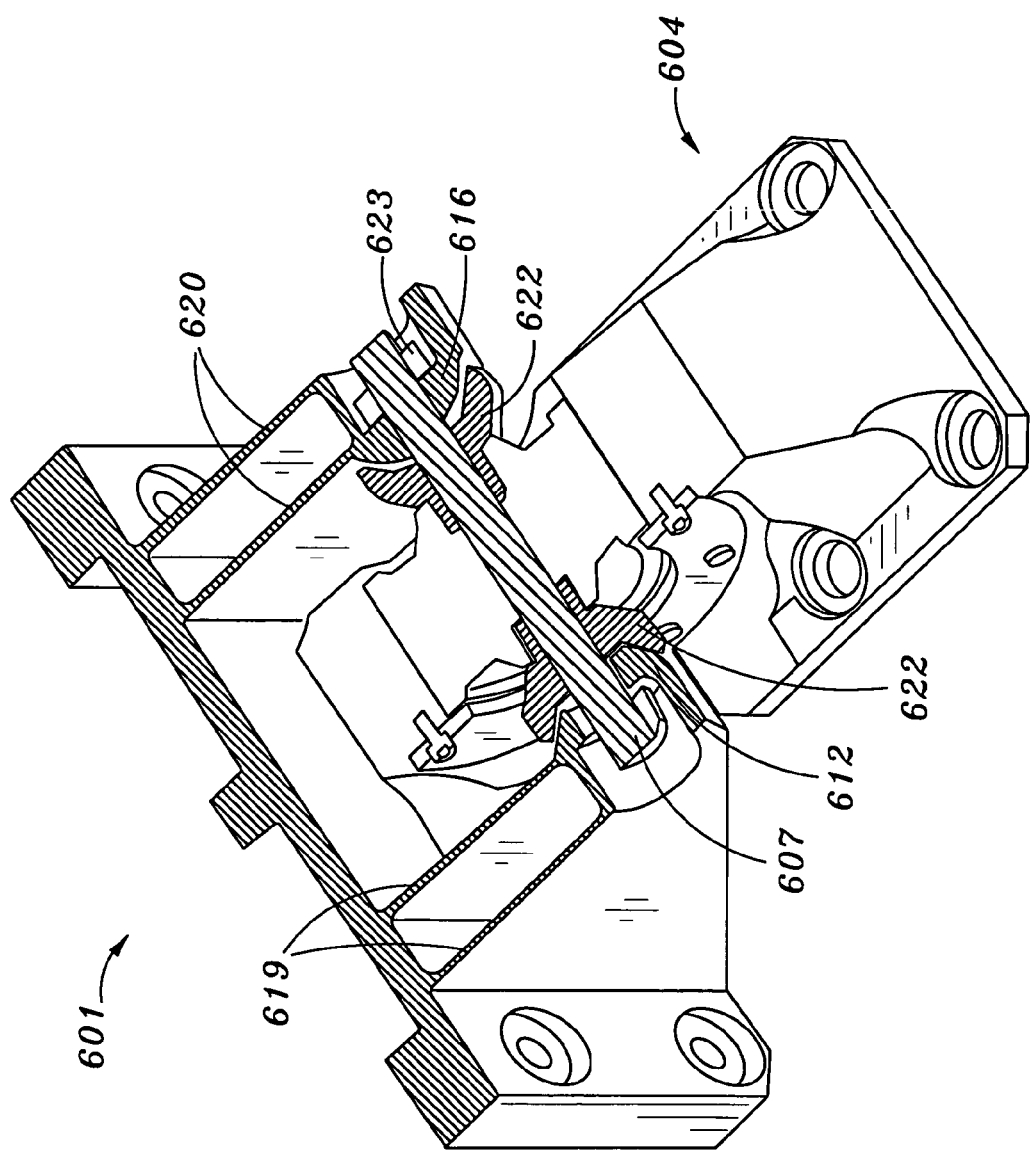
FIG. 12 is a cut-away view of the FIG. 4A enhanced deployment hinge, with the trigger removed.

Furthermore, FIG. 12 is a cut-away view of the same deployment hinge depicted in FIG. 11. In FIG. 12, first flexure pair 619 and second flexure pair 620 are holding first sphere 612 and second sphere 616 apart from outer axle 622, such that movable portion 601 is disengaged, or removed from the mechanical load path of stationary portion 604.

Figure 13:
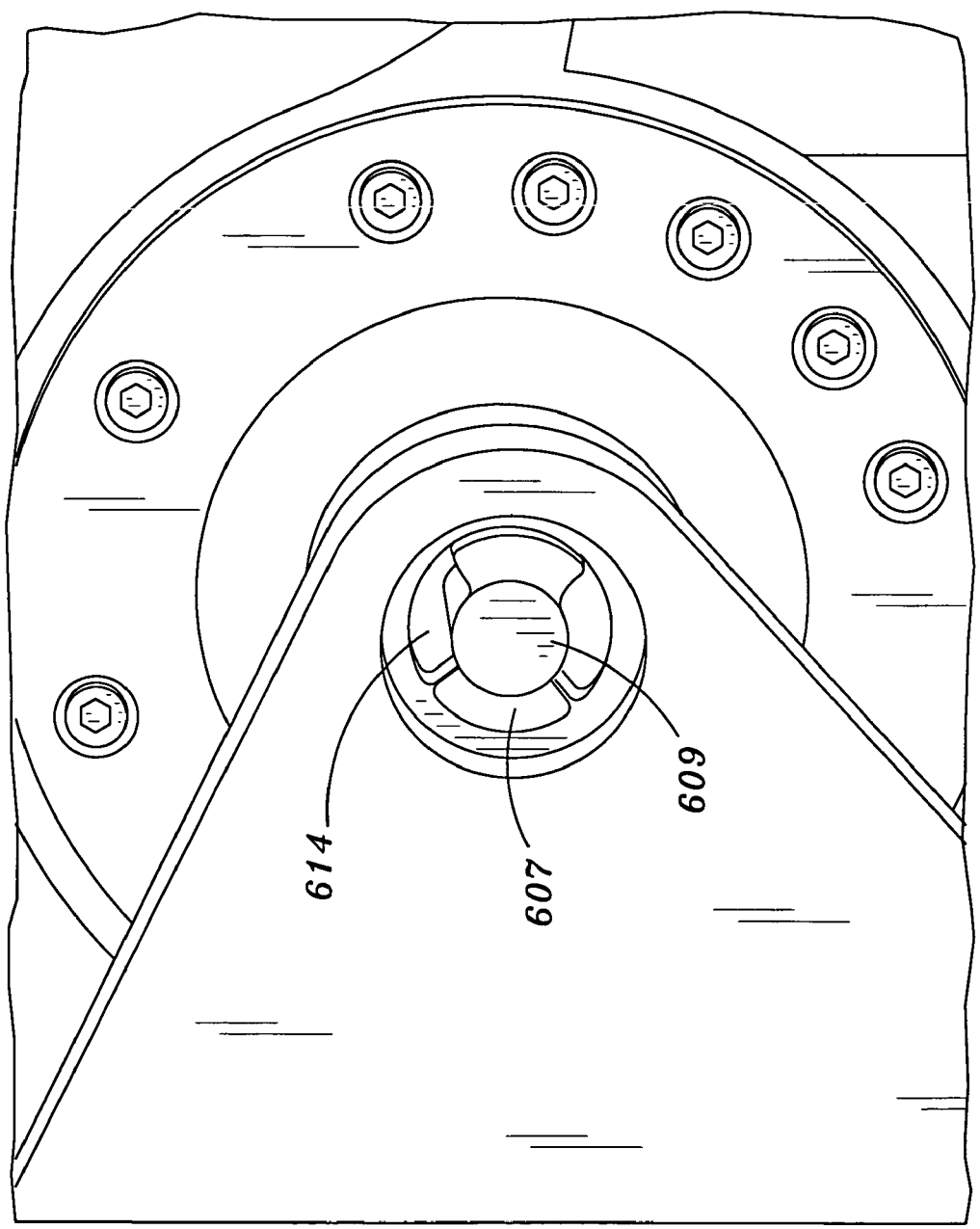
FIG. 13 is a close-up view of a key and a keyhole used by the FIG. 4A enhanced deployment hinge.

FIG. 13 is a close-up view of the key and a keyhole used by the FIG. 6A deployment hinge. Specifically, key 607 is affixed to first end 609 of inner axle 606, where interior keyhole 614 is cut from first sphere 612. In the deployed state, key 607 interlocks with enclosed keyhole 614 when assist spring 621 pushes key 607 into interior keyhole 614.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A deployment hinge, for deploying an appendage affixed to a stationary body, comprising:
 a movable hinge portion coupled to said appendage, said movable hinge portion comprising:
  an inner axle;
  a key affixed to a first end of said inner axle;
  trigger means affixed to a second end of said inner axle obverse to said first end; and
  an outer axle;
 a stationary hinge portion coupled to said stationary body, said stationary hinge portion comprising:
  a housing configured to receive said inner axle upon which said movable hinge portion moves, said housing comprising:
   a keyhole; and
   an assist spring configured to push said key in an unlocked position into said keyhole;
 wherein, in a non-deployed state, said outer axle of said movable hinge portion is mechanically engaged with said housing of said stationary hinge portion about an axis defined by said inner axle, thereby transferring a mechanical load to said stationary hinge portion from said movable hinge portion; and
 wherein, when deployed, said trigger means initiates a rotation of said inner axle such that said key aligns with said keyhole permitting said assist spring to push said inner axle, thereby mechanically disengaging said outer axle from said housing and removing said mechanical load from said stationary hinge portion.

2. The deployment hinge for deploying an appendage according to claim 1,
 wherein said stationary hinge portion housing further comprises:
  a first sphere having a cavity in which the key is disposed, the first end of said inner axle passing through said keyhole and a first opening in said first sphere, wherein said keyhole is enclosed in said first sphere;
  a second sphere having a second opening which the second end of said inner axle passes through,
  a first flexure pair connecting the stationary body to said first sphere, and
  a second flexure pair connecting the stationary body to said second sphere;
 wherein, in the non-deployed state, said first flexure pair exerts force on said first sphere away from said second sphere on said axis defined by said inner axle, and said second flexure pair exerts force on said second sphere away from said first sphere on the axis defined by said inner axle, while said key rests on a ledge in said first sphere so as to push said first sphere and said second sphere toward each other; and
 wherein, when deployed, said key is released from the ledge and interlocks with the enclosed keyhole in said first sphere so as to allow said first sphere and said second sphere to be pushed apart from each other.

3. The deployment hinge for deploying an appendage according to claim 2,
 wherein said assist spring is configured to push said key into the enclosed keyhole, and
 wherein, when deployed, said assist spring pushes said key into the enclosed keyhole.

4. The deployment hinge for deploying an appendage according to claim 2,
   wherein said moveable hinge portion further comprises a threaded nut,
   wherein the second end is threaded, and
   wherein the threaded nut is threaded onto the second end, causing said first flexure pair and said second flexure pair to flex inward, in the non-deployed state.

5. The deployment hinge for deploying an appendage according to claim 2, wherein said outer axle is located around said inner axle, including a first conical frustum, a second conical frustum obverse to said first conical frustum, and a narrow portion in physical communication with and between said first conical frustum and said second conical frustum; and wherein said movable hinge portion further comprises:
   an outer roller bearing ring affixed to said trigger means,
   an inner roller bearing ring in physical communication with and around said narrow portion, and
   a plurality of bearings in physical communication with and between said outer roller bearing ring and said inner roller bearing ring;
   wherein, in the non-deployed state, said key holds said first sphere and said second sphere in physical communication with said first conical frustum and said second conical frustum, respectively, and
   wherein, when deployed, said first flexure pair and said second flexure pair hold said first sphere and said second sphere apart from said outer axle, so that said first sphere and said second sphere are not in physical communication with said first conical frustum and said second conical frustum, respectively.

6. A deployment hinge for deploying an appendage according to claim 1, wherein said stationary body is a satellite.

7. A deployment hinge for deploying an appendage according to claim 1, wherein said appendage is a photovoltaic solar array, a mirror, an antenna mast, or a boom.

8. A deployment hinge for deploying an appendage according to claim 1, wherein said movable hinge portion is comprised of aluminum, titanium, beryllium, stainless steel, or aluminum beryllium.

9. The deployment hinge for deploying an appendage according to claim 8,
   wherein said stationary hinge portion housing further comprises:
      a first sphere, the first end of said inner axle passing through said keyhole and a first opening in said first sphere, wherein said keyhole is interior to said first sphere;
      a second sphere having a second opening which a second end of said inner axle, obverse to the first end, passes through,
      a first flexure pair connecting the stationary body to said first sphere, and
      a second flexure pair connecting the stationary body to said second sphere;
   wherein, in the non-deployed state, said first flexure pair exerts force on said first sphere away from said second sphere on said axis defined by said inner axle, and said second flexure pair exerts force on said second sphere away from said first sphere on the axis defined by said inner axle, while said key rests on a ledge in said first sphere so as to push said first sphere and said second sphere toward each other; and
   wherein, when deployed, said key is released from the ledge and interlocks with the interior keyhole in said first sphere so as to allow said first sphere and said second sphere to be pushed apart from each other.

10. The deployment hinge for deploying an appendage according to claim 9,
    wherein said assist spring is configured to push said key into the interior keyhole, and
    wherein, when deployed, said assist spring pushes said key into the interior keyhole.

11. The deployment hinge for deploying an appendage according to claim 9,
    wherein said moveable hinge portion further comprises a threaded nut,
    wherein the second end is threaded, and
    wherein the threaded nut is threaded onto the second end, causing said first flexure pair and said second flexure pair to flex inward, in the non-deployed state.

12. The deployment hinge for deploying an appendage according to claim 9, wherein said outer axle is located around said inner axle, including a first conical frustum, a second conical frustum obverse to said first conical frustum, and a narrow portion in physical communication with and between said first conical frustum and said second conical frustum; and wherein said movable hinge portion further comprises:
    an outer roller bearing ring affixed to said trigger means,
    an inner roller bearing ring in physical communication with and around said narrow portion, and
    a plurality of bearings in physical communication with and between said outer roller bearing ring and said inner roller bearing ring;
    wherein, in the non-deployed state, said key holds said first sphere and said second sphere in physical communication with said first conical frustum and said second conical frustum, respectively, and
    wherein, when deployed, said first flexure pair and said second flexure pair hold said first sphere and said second sphere apart from said outer axle, so that said first sphere and said second sphere are not in physical communication with said first conical frustum and said second conical frustum, respectively.

13. A deployment hinge for deploying an appendage according to claim 1, wherein said stationary hinge portion is comprised of aluminum, titanium, beryllium, stainless steel, or aluminum beryllium.

* * * * *